United States Patent [19]

Shah et al.

[11] 4,041,472
[45] Aug. 9, 1977

[54] DATA PROCESSING INTERNAL COMMUNICATIONS SYSTEM HAVING PLURAL TIME-SHARED INTERCOMMUNICATION BUSES AND INTER-BUS COMMUNICATION MEANS

[75] Inventors: Niranjan S. Shah; James F. Taylor, both of Escondido, Calif.

[73] Assignee: NCR Corporation, Dayton, Ohio

[21] Appl. No.: 681,363

[22] Filed: Apr. 29, 1976

[51] Int. Cl.² .......................... G06F 3/04; G06F 13/00
[52] U.S. Cl. ................................................. 364/900
[58] Field of Search ................ 340/172.5; 179/15 AL

[56] References Cited

U.S. PATENT DOCUMENTS

| | | | |
|---|---|---|---|
| 3,731,002 | 5/1973 | Pierce | 179/15 AL |
| 3,742,144 | 6/1973 | Brandenburg et al. | 179/15 AL |
| 3,755,789 | 8/1973 | Collins | 340/172.5 |
| 3,882,455 | 5/1975 | Heck et al. | 340/172.5 X |
| 3,889,237 | 6/1975 | Alferness et al. | 340/172.5 |
| 3,890,471 | 6/1975 | Hachenburg | 179/15 AL |
| 3,932,841 | 1/1976 | Deerfield et al. | 340/172.5 |
| 3,940,743 | 2/1976 | Fitzgerald | 340/172.5 |

Primary Examiner—Melvin B. Chapnick
Attorney, Agent, or Firm—J. T. Cavender; James H. Phillips; Edward Dugas

[57] ABSTRACT

A memory subsystem is connected to an addressable port on one bus and a non-memory subsystem is connected to an addressable port on another bus. Access to the memory is achieved by the non-memory subsystem by generating a message having a destination code indicating an address on its own bus. An inter-bus communication adapter is connected between the buses and intercepts the requesting message. The message is transmitted by the adapter while the destination code is altered to indicate the address of the memory subsystem on the other bus. The receiving memory subsystem responds by generating a response message and placing the source address into the destination address position of the message. The message is transmitted on the bus to which the memory is connected and is intercepted by a second inter-bus communications adapter. The second adapter transmits the response message to the first bus for application to the requesting subsystem.

4 Claims, 13 Drawing Figures fig. 1

DATA PROCESSING INTERNAL COMMUNICATIONS SYSTEM HAVING PLURAL TIME-SHARED INTERCOMMUNICATION BUSES AND INTER-BUS COMMUNICATION MEANS

The present invention pertains to a system for sharing memory and particularly to a system and method for the utilization of memory, connected to a time-shared bus, by a subsystem that is connected to a second time-shared bus.

Memory capacity is, of course, a fundamental parameter of any data processing system's performance capability. The size and speed of the memory or storage will greatly affect the ability of the data processing system to effectively and efficiently handle information. Bulk storage of large volumes of information which is infrequently required by the system may be stored in peripheral type memory subsystems such as discs, tapes and the like. Nevertheless, random access storage is the key storage facility within the data processing system. Most data processing systems are capable of handling several optional sizes of random access storage as part of the system; further, many data processing systems have the facility to accept additional random access memory in the form of free-standing units.

Intercommunication among various subsystems of a data processing system can be accomplished in several ways; one such means is the utilization of a common intercommunication bus which can be time-shared among the various subsystems. Each of the subsystems connected to the bus may be awarded a predetermined priority so that the higher priority subsystems receive preference in communication on the bus. In such systems, random access storage can be added to the system by attaching the newly added memory to the bus. However, regardless of the system architecture, the addition of random access storage in the form of a free-standing unit becomes expensive.

It is therefore an object of the present invention to provide a system and method for sharing memory.

It is another object of the present invention to provide a system and method to permit subsystems connected to separate intercommunication buses to access memory on either of the buses.

It is still another object of the present invention to provide a system and method to enable a subsystem connected to an intercommunication bus to access memory without "knowing" the physical location of the memory, and wherein the memory may be located on the same or different bus.

It is still another object of the present invention to provide a system and method for accessing memory on one bus by generating a request from a subsystem on another bus wherein the destination address of the message emanating from the subsystem is intercepted on the subsystem's bus, is altered and subsequently applied to the memory system's bus.

It is yet another object of the present invention to provide a system and method for intercommunication between two buses wherein each bus may have memory subsystems connected thereto and wherein non-memory subsystems connected to either bus may access memory on both buses.

These and other advantages of the present invention will become more apparent to those skilled in the art as the description thereof proceeds.

Briefly, in accordance with one embodiment chosen for illustration, a data processing system is provided with a time-shared intercommunications bus that is interconnected with a second time-shared intercommunication bus by two pairs of interbus communication adapters. Each bus may contain memory and non-memory subsystems connected to addressable ports on each of the buses. Certain of the ports are designated memory ports on each bus and all memory systems are connected to such ports. In the event a memory subsystem connected to one bus is to be accessible by non-memory subsystems on the other bus, a pair of inter-bus communication adapters are connected between the buses and between memory-designated ports on those buses. A second pair of inter-bus communication adapters is interconnected between the buses at those ports on the buses designated specifically for inter-bus communications. A non-memory subsystem may therefore access a memory on another bus simply by preparing a message with a destination code indicating the port on its own bus where the inter-bus communications adapter is located. Upon receipt of the message, the adapter transmits the message over cable to the other inter-bus communication adapter of the pair of adapters where the message is received. The destination address portion of the message is altered and the bus address is changed to the bus upon which the memory subsystem is located. The port at which the adapter is connected to the first bus is arranged so that the number of the port is the same as the number of the memory port on the second bus.

The message is thus applied to the second bus and is transmitted to the memory subsystem. The message, in addition to the destination code, includes a source code indicating the address of the subsystem from which the message emanated. The memory subsystem generates a response and places the response in an output register; however, the destination address of the response is taken directly from the source code present in the received message. This source code will include the address of the subsystem from which the original request emanated, which address will include the bus address of the non-memory subsystem. The output register from the memory subsystem is interrogated to determine if the portion of the destination address includes an indication of the first bus; since the message originated from the first bus, the destination address will therefore indicate the first bus. When the message is placed on the second bus, the port at which the returning messages are transmitted will automatically receive the response message and place the response message at the input register of the second pair of inter-bus communication adapters. The message will thus be transferred to the first bus with the proper destination code therein, and the originating subsystem will thus receive the response.

The system and method of the present invention will be described in terms of functional block diagrams and logic flow diagrams. The specific logic circuitry and logic techniques may vary greatly depending upon the particular logic philosophy implemented in a particular data processing system. Those skilled in the art will readily recognize that buffers, registers, gates as well as the timing and sequencing of the various functions can readily be chosen with the exercise of ordinary skill, all of such techniques being well known in the art.

The present invention may more readily be described by reference to the accompanying drawings in which.

Figure 1:
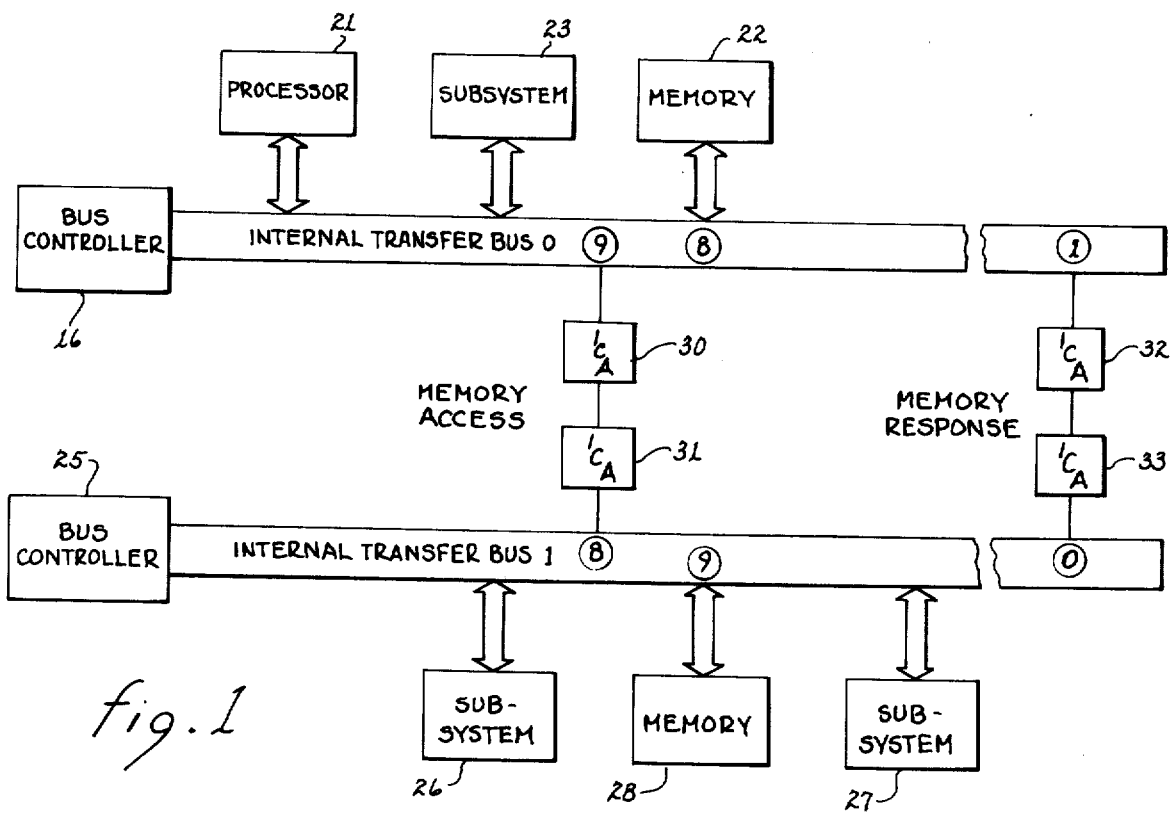
FIG. 1 is a schematic block diagram of a data processing system utilizing two internal transfer buses which system incorporates the teachings of the present invention.

The present invention can best be described by describing its relationship with a data processing system with which it is intended to be used. The data processing system will incorporate the usual components including a processor subsystem, a memory subsystem, an input/output subsystem, and various other subsystems which may be grouped into a single subsystem referred to as a service subsystem. Communication among the various subsystems is provided by an internal transfer subsystem which incorporates the components necessary to permit instructions and data to be transferred throughout the overall system. The processor subsystem includes the typical elements, including the necessary registers, arithmetic unit and the like. The service subsystem will include such elements as control console, operator's panel, control for certain types of peripheral devices such as a card reader CRT/keyboard, paper tape reader and the like. The memory subsystems may be formed using any of a variety of memory types and technologies and may be conveniently formed from MOS technology semiconductive memory elements.

The input/output subsystem assumes the task of controlling the flow of data into and out of the data processing system. The subsystems controlled by the input/output subsystem may include magnetic tapes and discs, printers and punches, check sorters and optical character readers and the like. In addition to the subsystems mentioned above, the system may incorporate a communications subsystem for communications control and multiplexing.

The portion of the system of the type described above of particular interest to the present invention is the internal transfer subsystem. This internal transfer subsystem incorporates a time-shared internal transfer bus as the principal communications channel among the various subsystems of the system. Each of the subsystems incorporates a local bus adapter forming an interface between the internal transfer bus and the individual subsystem. The transfer bus also incorporates a bus controller for controlling the functions of the bus activity.

In many data processing systems, the availability of add-on memory renders the system more flexible in that the system capacity and capability can be expanded through the addition of new memory modules. However, the addition of memory can be expensive both as to the initial cost of the updating addition as well as performance/cost ratios when the new memory is added. It is possible with some configurations to incorporate a shared memory which may be accessed by two or more systems. Such shared memory is in addition to the internal or captive memory of each individual system. Again, the expense of the addition of such "free-standing" memory is expensive, both as to initial cost as well as cost/performance ratio.

If both systems incorporate an internal transfer subsystem such as that described above, it has been found that each system can effectively incorporate the memory of the other system such that each system effectively has a total memory capacity equal to the capacity of both systems. In this manner, memory utilization is maximized and the overall efficiency of both systems is significantly increased. The alternative to the proposed system of memory sharing would require the addition of a free-standing memory to one or both systems which would significantly increase the storage cost and may significantly adversely affect system performance.

In a data processing system incorporating dual time-shared buses, each of the buses may incorporate the subsystems described above; however, when combining internal transfer bus systems in the manner proposed, it is not necessary to have all the different types of subsystems connected to each bus. For example, one bus may incorporate a larger memory subsystem and a relatively large number of input/output subsystems without a processor. The flexibility afforded by a multi-bus system is significant.

When more than one bus is used, an additional subsystem becomes necessary; that is, an inter-bus communications adapter which forms the communication path between the two buses and the subsystems connected to each of the two buses. A dual time-shared bus system is shown in FIG. 1 wherein it may be seen that internal transfer bus 0 is provided with a bus controller 16 and acts as the major communication path between various subsystems. A processor 21 and a memory 22 are connected to the internal transfer bus 0, together with one or more subsystems such as that indicated at 23. Each of the subsystems connected to the bus are connected at a port which will be described more fully hereinafter. For the present, it is simply noted that the memory 22 is connected to port 8. The second internal transfer bus 1 is also provided with a bus controller 25; subsystems such as those shown at 26 and 27 are connected to the bus 1 as is a memory subsystem 28. Again, each of the subsystems is connected to a predetermined port on the bus 1. Memory 28 is connected to the port 9. Intercommunication between bus 0 and bus 1 is provided by interbus communications adapters 30, 31, 32 and 33. The interbus communications adapters will be described more fully hereinafter; however, it may be noted that these adapters operate in pairs. That is, interbus communication adapters 30 and 31 operate together and are connected between port 9 on bus 0 and port 8 on bus 1. Similarly, interbus communication adapters 32 and 33 operate together and interconnect the internal transfer buses through connection to port 1 on bus 0 and port 0 on bus 1.

Figure 2:
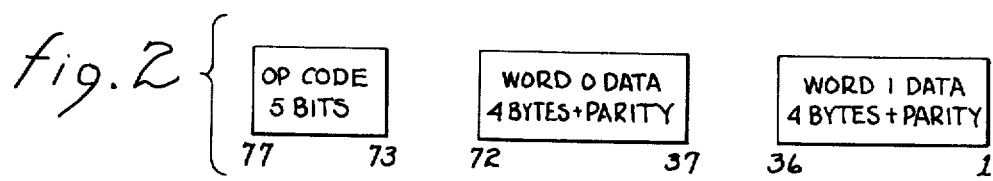
FIG. 2 is a diagram of a general message format useful in describing the operation of the system of FIG. 1 and useful in describing the chosen embodiment of the present invention.

The present invention may be understood by describing the elements of the various subsystems called upon to cooperate in the combination and method of the present invention. The internal transfer bus referred to above comprises a plurality of data lines for transmitting messages between and among the various subsystems connected to the bus. The data is transmitted in the message format shown in FIG. 2. Referring to FIG. 2, it may be seen that the format provides a 77-bit message incorporating a 5-bit operations code and two 36-bit words. Each of the words comprises four bytes plus parity. Word 0 occurs in every message on the bus while word 1 is only used in double word messages. The messages size is determined by the message function; for example, a Fetch op code requires only the utilization of the op code and word 0 while the response from memory to the Fetch command would require not only the op code but also the word 0 and word 1 containing the requested data. The 5-bit op code may be utilized to define 32 different function codes which need not be reviewed here; however, it will be obvious to those skilled in the art that the op code functions will include such things as Fetch from memory and the op code Response to the Fetch code.

Figure 3:
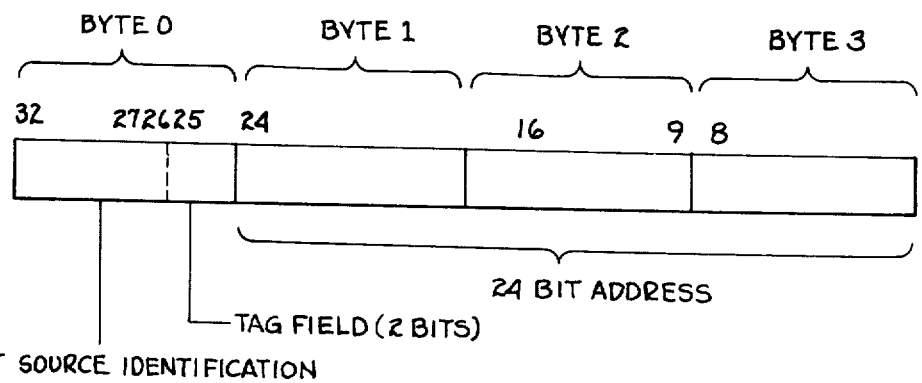
FIG. 3 is a diagram of a word of the message format used in the chosen embodiment.

Word 0 is used to transfer logical information across the bus. For example, referring to FIG. 3, the 32-bit word 0 format is shown. When the op code is a Fetch to memory, the format of word 0 is shown as in FIG. 3 wherein it may be seen that bits 27 through 32 contain a 6-bit source identification. A 2-bit tag field is provided and bits 1 through 24 provide a 24-bit address. The tag field may be used to select a byte within the addressed memory word while the 6-bit source identification code identifies a subsystem from which the Fetch code emanated. As previously mentioned, all subsystems connected to the bus incorporate a local bus adapter which acts as an interface between the subsystem and the bus. The 6-bit source identification appended to each message from a subsystem is automatically appended by the local bus adapter forming the interface between that subsystem and the bus.

Word 1 is used to transmit data between the subsystems. In communications between a subsystem and a memory subsystem, word 1 contains either a word to be written into or a word that has been read from memory.

The internal transfer bus is provided with a plurality of connection terminals or ports, each of which is intended for connection to a subsystem. As part of the overall data processing system architecture and functional discipline, certain ports may be designated for certain types of subsystems. For example, in the specific embodiment chosen for illustration, ports 0, 1, 2 and 3 are reserved for connection to interbus communications adapters to provide intercommunication between buses. Ports 8, 9, 10 and 11 are reserved for memory subsystems while ports 14 and 15 are reserved for processor subsystems. In a multiple bus environment, each of the internal transfer buses is provided with a number coded into bits 5 and 6 of the destination address located in byte 0 of word 0 of the internal transfer bus message format as will be described more fully hereinafter. The provision of the ports on the internal transfer bus provides a convenient scheme for allocating priority and, accordingly, priority is awarded in accordance with physical port position. Messages are placed on the internal transfer bus and transferred in accordance with a bus clock that is provided to each of the local bus adapters connected to the individual bus.

Figure 4:
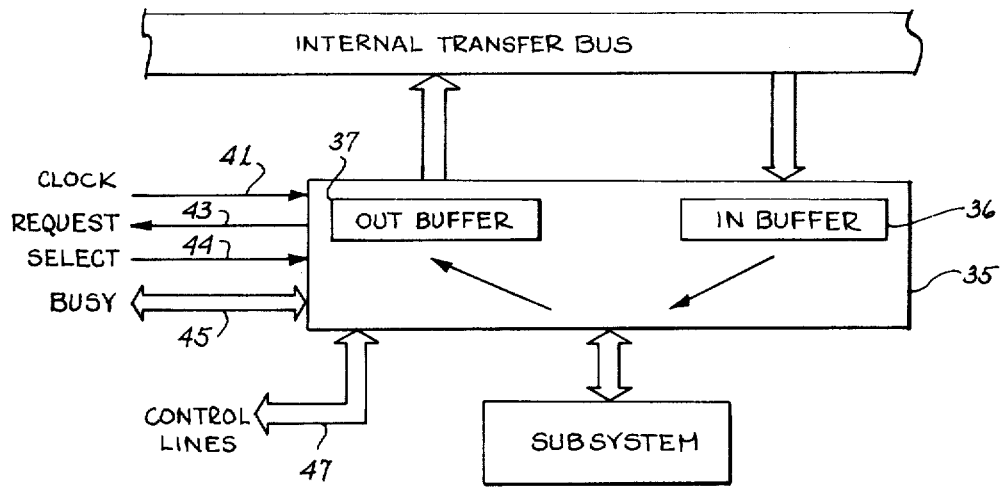
FIG. 4 is a schematic block diagram of a local bus adapter illustrating the intercommunication of subsystems with the time-shared internal transfer bus.

To facilitate description of the message transfer from the subsystem to the bus, it is useful to first describe the local bus adapter interfacing the bus with the respective subsystems. Referring to FIG. 4, a local bus adapter 35 is shown and incorporates a complete input message buffer 36 and an output message buffer 37 and may therefore accept a message from the internal transfer bus at the same time it is accepting a message from its corresponding subsystem. The input/output for the local bus adapter 35 may therefore be concurrent. Each local bus adapter has a busy line, and all busy lines are available in each local bus adapter. Every busy line can be set to indicate a busy state by any local bus adapter; therefore, when one subsystem wishes to communicate with another subsystem, a request issued by the source subsystem's local bus adapter, along with the identification of the prospective destination subsystem. The source local bus adapter internally interrogates the busy line of the prospective destination subsystem, and if the destination subsystem is not busy, the source local bus adapter issues a request for access to the bus to the bus controller.

Referring to FIG. 4, it may be seen that the local bus adapter 35 receives the internal transfer bus clock 41 from the bus controller and also communicates to the bus controller through a request line 43 to request use of the bus, a select line 44 to indicate that the bus is available for use by the individual local bus adapters and a plurality of busy lines 45, each indicating that a local bus adapter, with which the adapter 35 may wish to communicate, on the bus is busy. In addition, control lines 47 for various functional signals provide communication between the local bus adapter and the bus controller to indicate various status conditions to be described more fully hereinafter. A more complete description of the local bus adapter and its interrelation with the internal transfer bus may be found in co-pending patent application Ser. No. 633,345 filed Nov. 19, 1975 entitled "High Speed Destination Selection Means for a Bus Oriented Computer System", which application is assigned to the assignee of the present application.

When the local bus adapter places a message on the bus, it must maintain that message in its output buffer until it receives a "message accepted status" from the bus controller. When the local bus adapter puts a message on the bus and maintains that message in its buffer, it transmits a request signal to the bus controller and awaits a select signal therefrom. The message, however, remains in the output buffer until it receives an indication of status. The status is returned with the next bus cycle following the placing of the message on the bus.

During the cycle awaiting the status, a message may be transmitted to the local bus adapter. That is, the local bus adapter could be receiving a message from the bus at the same time it is verifying the status of a message that has previously been transmitted on the preceding clock. The requirement for status response from the destination local bus adapter puts a limit on the transfer rate through the local bus adapter to the bus and from the bus through the local bus adapter to the subsystem. In the system chosen for illustration, it is contemplated that the local bus adapter can receive a message at a maximum rate of one for every fourth bus cycle; further, it can send a message at a maximum rate of once every fourth bus cycle.

Messages from the subsystem to the bus may be either input/output (non-memory) messages or memory messages. If the message is to memory, the local bus adapter will mask bits 3 and 4 of the memory address to provide interleaving of plural memories. This translation process will result in the proper destination address being placed in the destination register. It will be remembered that memories are always placed on bus ports 8, 9, 10 and 11 and may be interleaved one-way, two-way or four-way. The technique of interleaving memories is well known and need not be discussed here. Basically, interleaving techniques provide for the storage of successive addresses of a block of information in alternate memories; that is, alternate words would be stored in different memories although successive words in the information block would theoretically have successive addresses. The subsystem providing the block of information to be stored would not "know" that the information was actually being stored, alternately one word at a time, in two or more physically different memories. The interleaving lines of the bus define the arrangement of the memories as follows:

| Interleaving Code Bits 3 2 1 | definition |
| --- | --- |
| 0 0 0 | 1 way port 8 |
| 0 0 1 | 1 way port 9 |
| 0 1 0 | 1 way port 10 |
| 0 1 1 | 1 way port 11 |
| 1 0 0 | 2 way ports 8, 9 |
| 1 0 1 | 2 way ports 10, 11 |
| 1 1 1 | 4 way ports 8, 9, 10, 11 |

For the first four codes, the destination address will always be determined by the location of the memory, i.e., it will either be 8, 9, 10 or 11. When the code defines either two-way or four-way interleaving, the interaction of bits 3 and 4 with the code determines the address as follows:

| Bits 4 3 | Interleaving Code | Destination Address |
| --- | --- | --- |
| — | 0 0 0 | 8 |
| — | 0 0 1 | 9 |
| — | 0 1 0 | 10 |
| — | 0 1 1 | 11 |
| 0 0 | 1 0 0 | 8 |
| 0 1 | 1 0 0 | 9 |
| 1 0 | 1 0 0 | 8 |
| 1 1 | 1 0 0 | 9 |
| 0 0 | 1 0 1 | 10 |
| 0 1 | 1 0 1 | 11 |
| 1 0 | 1 0 1 | 10 |
| 1 1 | 1 0 1 | 11 |
| 0 0 | 1 1 1 | 8 |
| 0 1 | 1 1 1 | 9 |
| 1 0 | 1 1 1 | 10 |
| 1 1 | 1 1 1 | 11 |

For memory messages, the least significant four bits of the destination field in the message to the local bus adapter are ignored while the two most significant bits are used to determine the bus address. The interleaving lines of the bus are controlled by the bus controller. The interleaving will, of course, depend on system configuration and may be controlled by firmware.

The bus controllers 16 and 25 each provide several functions for the internal transfer subsystem. These functions include providing a subsystem clock for clocking all of the message transfers on the internal transfer bus. The bus controller also checks priority on all messages being transferred on the bus and if parity is correct, signals that fact to the concerned local bus adapters. In addition to the checking parity, and as mentioned previously, priority on the internal transfer bus is determined in accordance with the physical location of the port to which the subsystem is connected. Priority, however, is controlled by the bus controller so that only the messages emanating from the highest priority ports are permitted access to the bus in the event of a conflict between ports.

Figure 5:
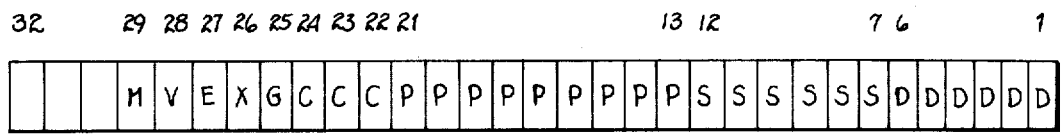
FIG. 5 is a diagram of a word configuration stored in the history log of the bus controller.

Although not necessary to the implementation of the present invention, it will be useful to describe some additional functions of the bus controllers. A bus controller also maintains a history log incorporating 16 registers of 32 bits each housed in the bus controller. The history log keeps a record of recent message transmissions on the internal transfer bus by making an entry into the log for each message transmitted. The entry made into the history log is in a format as shown in FIG. 5. Bits 1 through 6 (marked D) represent the destination address, bits 7 through 12 (indicated by S) represent the source address, bits 13 through 21 (indicated by P) indicate parity error and provide the word and byte in which the parity error occurred, bits 22 through 24 (indicated by C) indicate an error in the status code, bit 25 (indicated by G) is a good parity indicator, bit 26 (indicated by X) represents a single word transfer indicator which equals 1 if a double word transfer is occurring and 0 if it is a single word transfer, bit 27 (indicated by E) is an error entry indicator to indicate if there is an error or errors associated with the message, bit 28 indicated by V) is a validity bit, and bit 29 (indicated by M) indicates a corrected data op code response. It may be seen then that for each message being transmitted on the internal transfer bus, the registers of the history log in the bus controller maintain a record of the destination address, the source address, the parity error indicator bits, the status code error indicator bit, a good parity indicator, a single word transfer indicator, and an error entry indicator. A status entry is made for each message on the internal transfer bus. As each message occurs, the status entries are entered in the log. As the log becomes full after 16 entries and from that point on, each subsequent entry forces the oldest entry out of the log. Therefore, the log will contain a record of the last 16 messages transmitted on the internal transfer bus. When an error is detected on the internal transfer bus, the history log will store the status and send the signal to the appropriate subsystem for appropriate action.

Communication between buses is accomplished through inter-bus communications adapters such as those shown at 30–33 in FIG. 1. The adapters transfer the entire message from one bus to the other, including the destination address, the operations code, word 0 and word 1. The adapters operate in pairs, one connected to each bus and the two adapters interconnected by cable. The inter-bus communications adapters are used for two basic functions: first, they are used to transfer messages from a non-memory subsystem on one bus to a memory subsystem on another bus; and second, they are used to transfer messages from memory and non-memory subsystems on one bus to non-memory subsystems on the other bus. The adapter recognizes the difference between memory type messages and non-memory type messages by examining bit 5 of the operations code. The system of the present invention incorporates the utilization of the multiple time-shared bus concept wherein subsystems on each bus share memories located on both buses.

Figure 6:
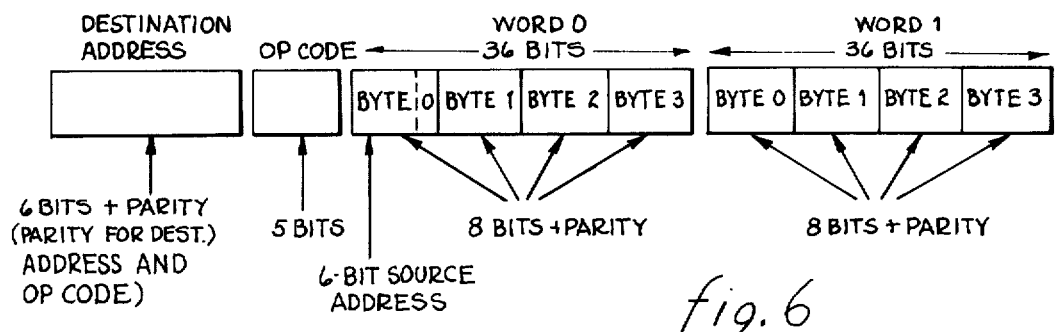
FIG. 6 is a diagram of a generalized message format showing the destination address appended to a message.
Figure 7:
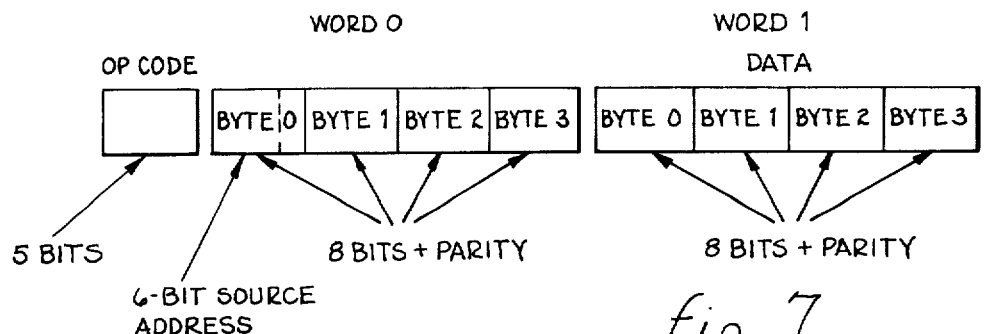
FIG. 7 is a diagram of a message format as received at the input register of a receiving subsystem's local bus adapter.

The message format utilized in the system of the present invention is shown in FIG. 6. Referring to FIG. 6, it may be seen that the general message format incorporates two words of four bytes each; each byte includes eight bits plus parity. An op code of five bits, together with a six-bit destination address is provided, together with a parity bit for the combined destination address and operations code. As stated previously, bits 5 and 6 of the destination address indicate the bus number while bits 1 – 4 designate the port number on the bus. The parity bit shared by the destination address and operation code as well as the parity bit for the word 0, byte 0, are generated by the local bus adapter. The parity bits for the rest of the word 0 and for all of the bytes of word 1 are supplied by the corresponding subsystem. Utilizing the above message format, and as stated previously in connection with local bus adapters, each of the adapters incorporates an input and output register for receiving and sending messages. The output register of the individual local bus adapters corresponds to the message format set forth in FIG. 6. The input or receiving register for each of the local bus adapters corresponds to the message format shown in FIG. 7. It may be seen that the message format for the output or sending register (FIG. 6) is similar to that for the input or receiving register format (FIG. 7) with the exception of the elimination of the destination address in the latter. When a return message to required in accordance with the decoding of the operations code, the destination local bus adapter extracts the source address from word 0, byte 0, of the input message. This address is then used as the destination address of the output or reply message.

A message sending and receiving procedure may be described in accordance with the following definitions of cycles. For sending a message, the message is first constructed and placed in the output register of a local bus adapter. A first cycle is then instituted wherein a request is raised from the local bus adapter to the bus controller after the source local bus adapter has checked the destination local bus adapter busy line to ensure that the destination adapter is prepared to receive a message. If the busy line indicates the source adapter is in condition to receive the message, the second cycle comprises the selection of the source local bus adapter by the bus controller with the placing of the message from the output register on the bus. The third cycle comprises the receipt of the appropriate status message from the destination local bus adapter indicating that the message has been received. The sending sequence is completed by a fourth cycle wherein the source local bus adapter is reset to recover and handle new messages. If the status received indicates an error, the source adapter begins again at the first cycle and retries to send the message. All of the above cycles are predicated on priority being awarded by the bus controller to the local bus adapter. If priority is not awarded, then the cycles are not consecutive clock cycles since the local bus adapter must await receipt of priority for use of the bus.

The receiving sequence also requires four cycles. The first cycle is the examination by the source local bus adapter of the busy line of the destination loca bus adapter. Again, assuming priority is awarded, the message is received by the destination local bus adapter followed by the third cycle to indicate status of the received message. Assuming appropriate status, the fourth cycle incorporates recovery for the receipt of a new message. If the status sent by the destination local bus adapter indicates an error, reset takes place during the third cycle and the destination local bus adapter is therefore ready for a new message after the third cycle, rather than awaiting for the fourth cycle. It may be seen that the local bus adapter is able to process a received message while sending a message. If a received message is being processed while the adapter is sending a message, the message times can be overlapped.

The inter-bus communication adapters contain an interface for input to output from an internal transfer bus to which it is attached. Each adapter also contains all the logic control and hardware required to simultaneously send a message to, while receiving a message from, the inter-bus communications adapter to which it is interconnected by cable. Data is then transferred from source bus to the inter-bus communications adapter, from the adapter to the corresponding adapter connected to the destination bus and then to the destination bus proper.

Figure 8:
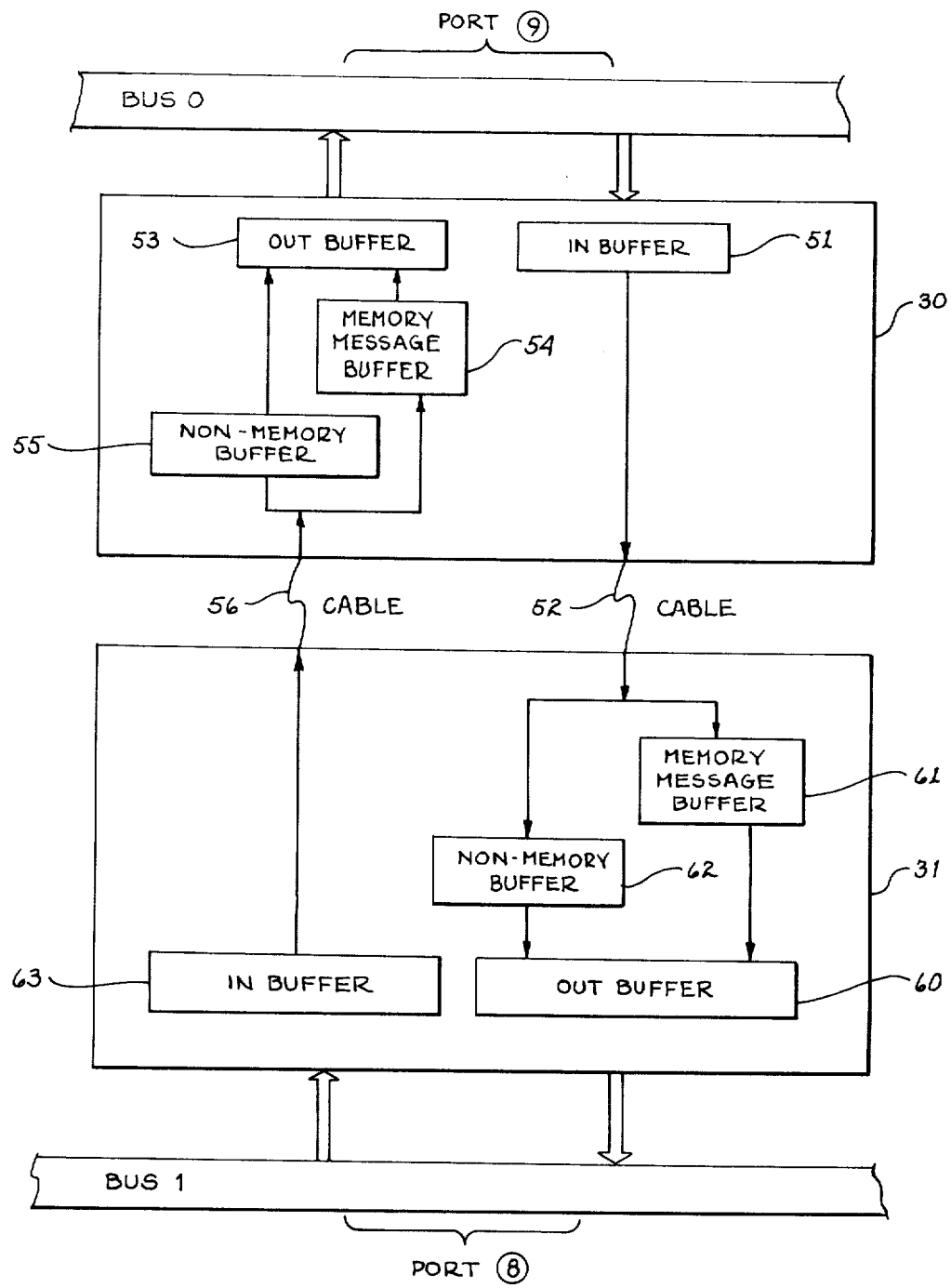
FIG. 8 is a schematic block diagram of an inter-bus communications adapter showing the interconnection of two time-shared buses and the flow of information therebetween.

Referring to FIG. 8, a schematic block diagram is shown of the two inter-bus communications adapters 30 and 31 connecting bus 0 with bus 1. The inter-bus communications adapter 30 includes an input buffer 51 for receiving messages from the bus 0 and for transmitting the receiving message via cable 52 to the inter-bus communications adapter 31. The adapter 30 also includes an output buffer 53 for holding messages to be placed on bus 0. The output buffer 53 is supplied the message to be transmitted to bus 0 from either a memory message buffer 54 or a non-memory message buffer 55. Input to buffers 54 and 55 is received by cable 56 from the inter-bus communications adapter 31. The adapter 31 is identical to the adapter 30 and includes an output buffer 60 which is supplied with a message from either a memory message buffer 61 or a non-memory message buffer 62. Similarly, an input buffer 63 receives a message from bus 1 to be transferred to bus 0. The adapter 30 is connected to bus 0 at port 9 while the adapter 31 is connected to bus 1 at port 8. The reasons for the interconnection of the buses at the specific port numbers will become apparent as the description of the operation of a memory message transfer is described.

Figure 9:
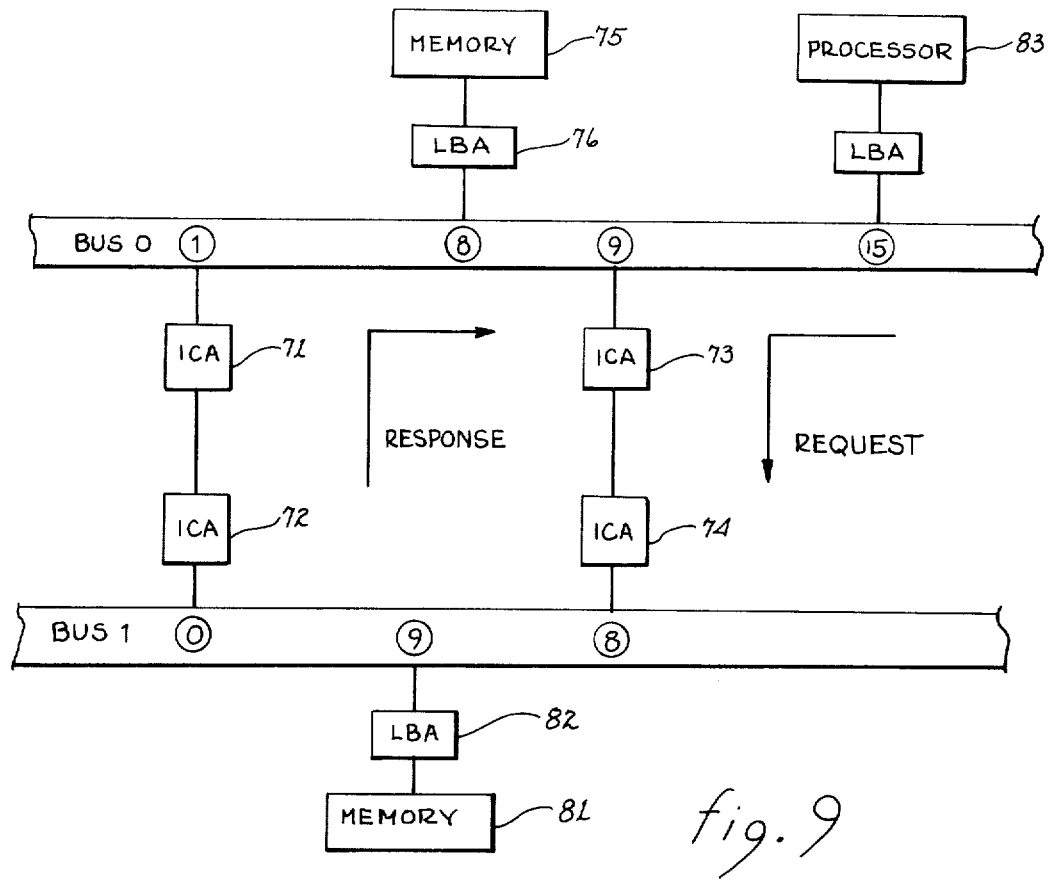
FIG. 9 is a simplified block diagram of the system of FIG. 1 useful in describing the flow of messages between the buses.

A simplified system is shown in FIG. 9 to facilitate the description of the inter-bus transfer of requests for stored information and the response from memory to the request. FIG. 9 illustrates the utilization of inter-bus communication adapters 71 and 72 connected between port 1 of bus 0 and port 0 of bus 1. A second pair of inter-bus communication adapters 73 and 74 are shown connected between port 9 of bus 0 and port 8 of bus 1. A memory subsystem 75 is connected through a corresponding local bus adapter 76 to port 8 of bus 0. A memory subsystem 81 is connected through a corresponding local bus adapter 82 to port 9 of bus 1. A processing subsystem 83 is shown connected to port 15 of bus 0. Thus, FIG. 9 illustrates the utilization of intercommunication adapter pairs connected between bus 0 and bus 1; bus 0 incorporates a memory subsystem connected to port 8 and a processor connected to port 15 while bus 1 is shown including only a memory subsystem connected to port 9. It will be understood by those skilled in the art that a variety of system configurations may be utilized on each of the buses and that other subsystems may be connected to the respective buses. It will be recalled that in the architecture of the system chosen for illustration, bus ports 8 and 9 were reserved for memory subsystems; further, bus ports 0 and 1 were reserved for inter-bus communication links. The system shown in FIG. 9 is provided with two memory subsystems, each connected to a different one of the two buses; the memory subsystem are identical size and configuration and, using the system chosen for illustration, may be interleaved. The processor connected to port 15 of bus 0 cannot distinguish between the memory subsystem on its bus or on the interconnected bus; the processor only "knows" that it has a memory available to it of a size equal to the combined sizes of the two memory subsystems. The processor also only "knows" that its memory is connected to ports 8 and 9 of its bus.

Figure 12:
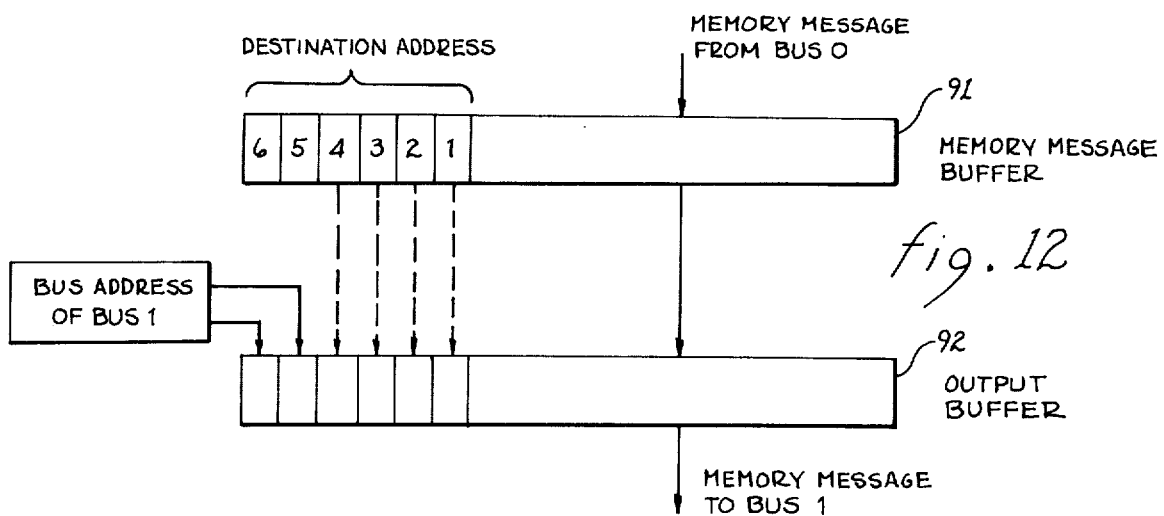
FIG. 12 is a schematic block diagram of a memory message buffer and an output buffer of an inter-bus communications adapter illustrating the alteration of the destination address when a memory message is transmitted from one bus to another.

Utilizing the message format described previously in connection with FIG. 6, and utilizing the configuration of FIG. 9, a sequence of a memory access may be described. A message generated by the processor 83, incorporating, for example, an op code Fetch, is formed with the format shown in FIG. 6. The destination address of the local bus adapter incudes the apparent address of the memory subsystem on bus 1; however, the position of the memory subsystem on bus 1 is unknown to the processor and therefore the processor simply accesses or addresses port 9 on bus 0. Therefore, the destination address will indicate simply bus 0 - port 9. (Bits 1 through 4 indicate port 9 while bits 5 and 6 indicate bus 0). The local bus adapter at port 15 of bus 0 also automatically incorporates a 6-bit source address in byte 0 of word 0. Thus, the message contained in the output register of the local bus adapter at port 15 incorporates a source code of bus 0, port 15 and a destination address of bus 0, port 9. The message is applied to port 9 which is not a memory but an inter-bus communications adapter. The source inter-bus adapter receives the message at its input buffer and transmits the message over the interconnecting cable to the paired inter-bus communication adapter. The adapter at the destination bus receives the message in its memory message buffer. At this point, the message is changed by altering the destination code from bus 0, port 9 to bus 1, port 9; that is, bits 5 and 6 of the destination address are changed to reflect bus 1 rather than bus 0. The appropriate change in parity is also made at this time. The change inthe source code to reflect the destination bus address may be described by reference to FIG. 12. The memory message is received from the inter-bus communications adapter connected to bus 0 and is applied through a cable to the memory message buffer 91 of that portion of the adapter connected to bus 1 (this buffer corresponds to memory message buffer 61 of FIG. 8). The memory message in the buffer 91 includes a 6-bit destination address as shown in the left of the message buffer. The destination address includes a 4-bit port code as well as a 2-bit bus address. Bits 5 and 6 designate the bus address; however, since the message is being transmitted to bus 1 ("unknown" to the source subsystem), the message in the memory message buffer 91 is transferred to the output buffer 92 with the destination address bits 5 and 6 changed to designate a bus address of bus 1. Since the inter-bus communications adapter has been connected between memory ports of the two buses, the change in the bus address effected by that portion of the adapter connected to the destination bus is known and may be wired into the adapter. The message is then applied to bus 1, port 9 to which a memory subsystem is connected. The local bus adapter at bus 1, port 9 receives the message at its input register. The source code of the message is then placed in destination code position so that the new destination code becomes bus 0, port 15. The response message, as called forth by the op code, is placed on bus 1 with a destination code having bus 0 therein. All messages placed on a bus, such as bus 1, with a destination code including the code of another bus are directed to the port having the same number as the destination bus. That is, a destination address, including a bus code of bus 0, placed on bus 1 will automatically be directed to port 0 of bus 1. Since port locations of all inter-bus communications adapters are known in advance, the above feature may be readily wired in.

Figure 13:
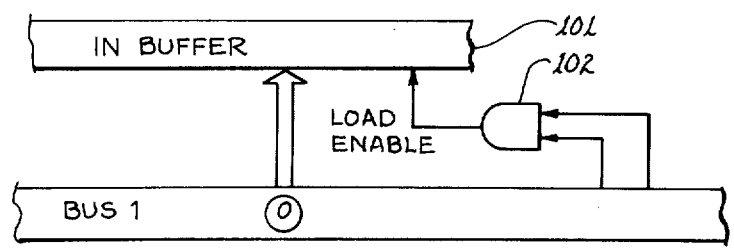
FIG. 13 is a simplified schematic block diagram illustrating the loading of an in buffer of an inter-bus communications adapter in response to the detection of a predetermined bus code in the destination address of a response message from a memory subsystem on one bus to be transmitted to a subsystem on another bus.

A simplified logic schematic is shown in FIG. 13 representing an implementation of the receipt and retransmission of the message placed on bus 1 by the memory subsystem. As described above, the destination address placed on bus 1 by the memory subsystem in its response to a request from a subsystem on bus 0 includes as the destination address the source address previously received. The source add ss includes bits 5 and 6 indicating bus 0. An input buffer 101 (this buffer corresponds to input buffer 63 of FIG. 8) which is part of the inter-bus communications adapter connected to port 0 of bus 1 is loaded by the response message through the utilization of a gate 102 that detects the proper bit configuration of bits 5 and 6 of the destination code. If those bits indicate that bus 0 is the destination for the message, the gate will enable the loading of the buffer 101 for subsequent transmission to bus 0. Thus, the inter-bus communications adapter at port 0 of bus 1 accepts the response for transfer to bus 0; the processor at bus 0, port 15 thus receives the response. It may be noted that the memory subsystem supplies a new source code to the response message. This source code identifies the memory port (bus 1, port 9). Although the source code is disregarded by the receiving processor subsystem, it is stored in the history log of the bus controller as previously described.

It may therefore be seen that access to a memory subsystem may be gained from subsystem on the same bus or on an interconnected bus. When an access to a memory subsystem on an interconnected bus is required, the message is transmitted through inter-bus communications adapters connected to memory subsystem ports which therefore present a "picture" to subsystem connected to that bus of simply another memory subsystem. That is, subsystems on a bus are unaware that the memory which they may be accessing is on a different bus. The message travels from a memory port on a source bus through inter-bus communication adapters; the destination adapter changes the designation of the bus number while leaving the designation of the destination port the same. Thus, while the destination was originally bus 0, port 9, it now becomes bus 1, port 9. Since the memory subsystem connected to bus 1 was connected to the same port number as the port number to which the inter-bus communication adapter was connected to bus 0, the altered destination code is a correct designation of the port of the memory system on the interconnected bus. All responses from memory to a requesting subsystem on another bus are directed to the other bus through a second set of inter-bus communication adapters. The second set of adapters are connected between positions or ports 1 on bus 0 (indicating that bus 1 is connected at this point) and port 0 on bus 1 (indicating that bus 0 is connected at that point).

When the memory subsystems are located on separate buses, an accessing subsystem will not know which of the memories with which it is communicating. When the memory subsystems are interleaved, the successive accesses are to alternate memory subsystems.

Figure 10:
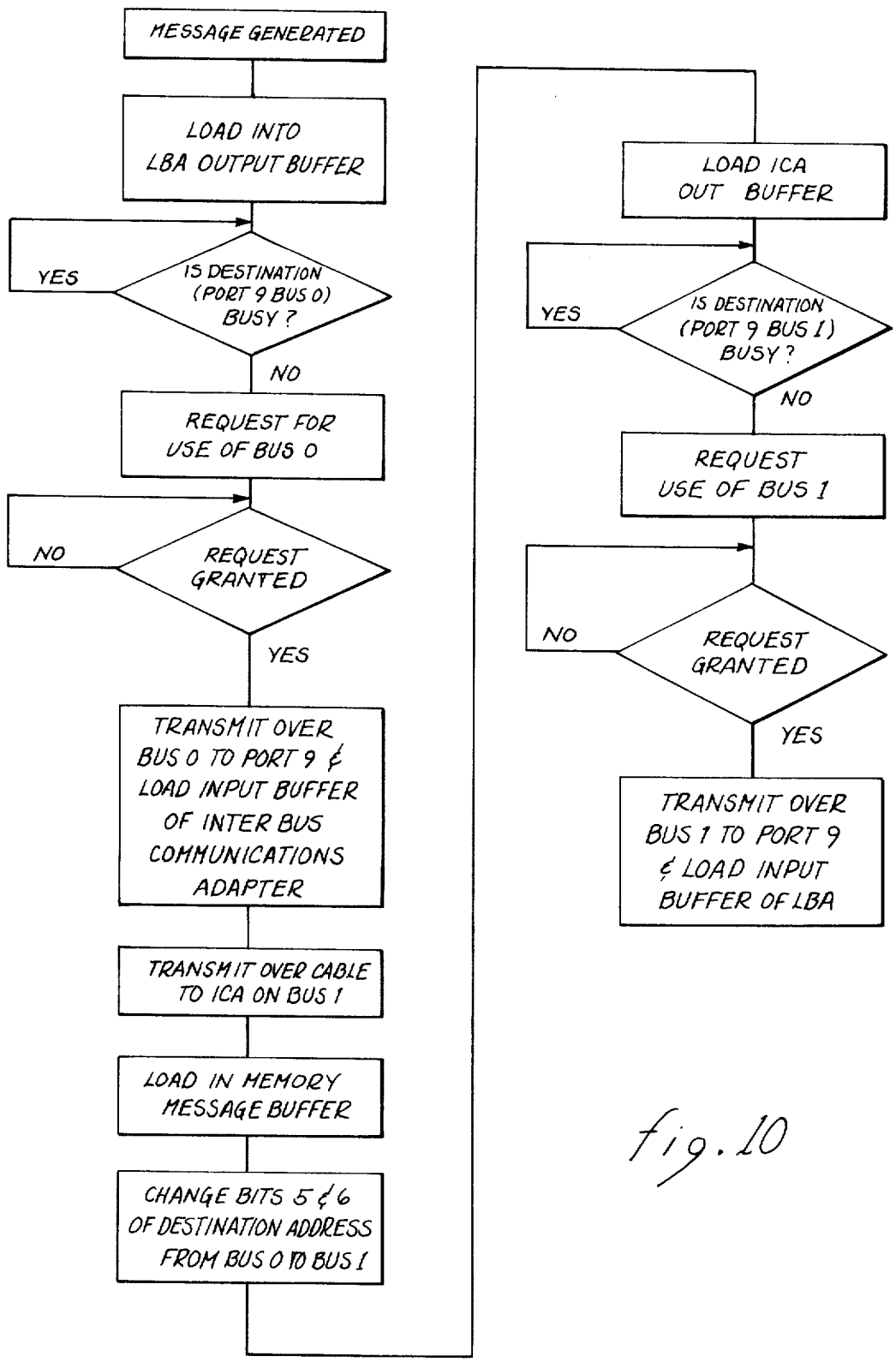
FIG. 10 is a logic flow diagram of a message sequence demonstrating a message transmission in the form of a request from a processor on one bus to a memory subsystem on another bus.
Figure 11:
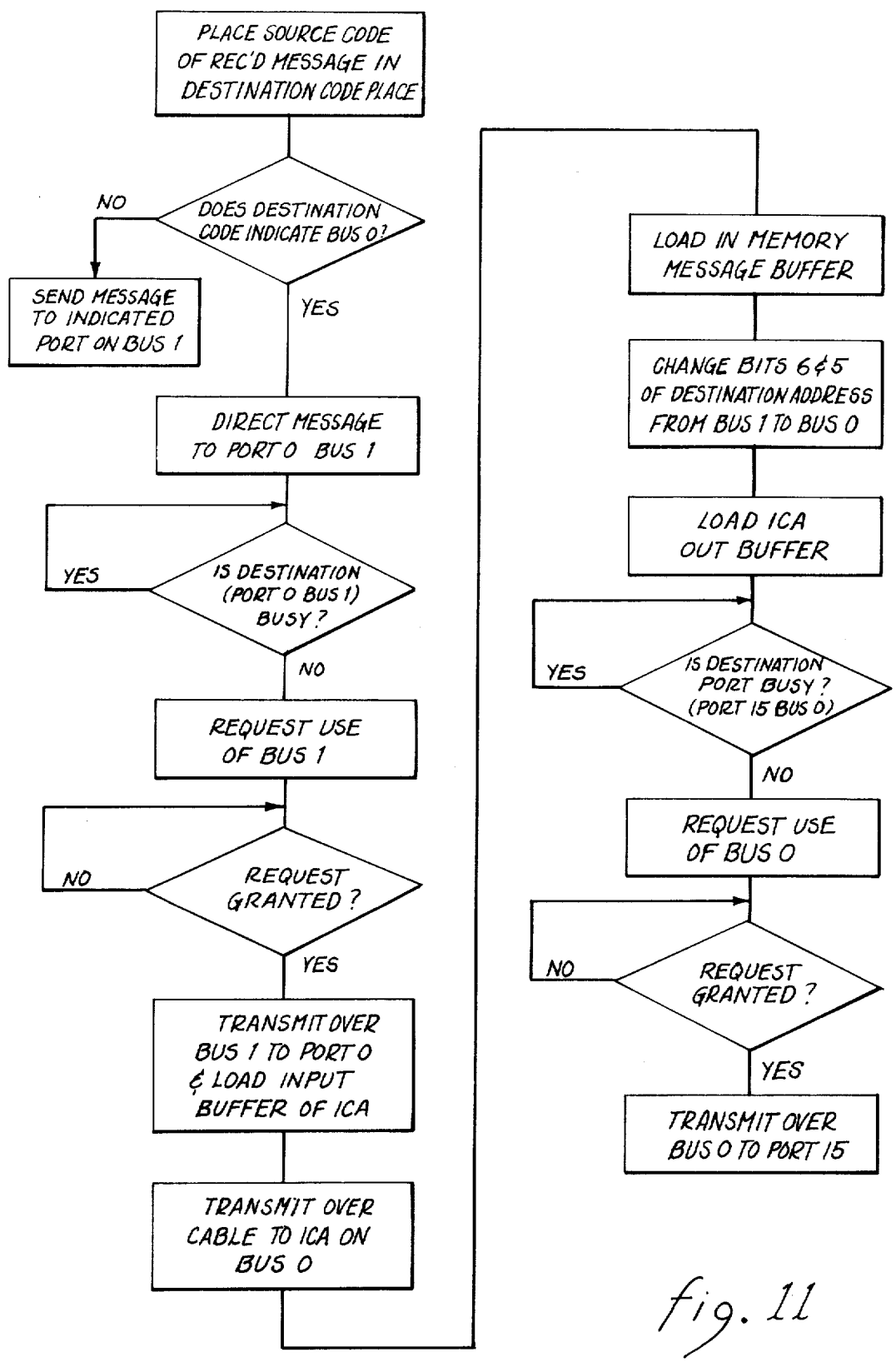
FIG. 11 is a logic flow diagram showing the sequence of events resulting from a response from the memory subsystem to the request from the processor.

FIG. 10 is a logic flow diagram indicating the transfer of a message from a generating subsystem to a memory physically located on a different bus. The specific example chosen for illustration is the generation of a Fetch code from a processor connected to port 15 of bus 0; the example is the same as that previously described but places the sequence in a flow diagram to facilitate the understanding of the sequence of events. Similarly, FIG. 11 is a logic flow diagram of a response from memory to the request sequence of FIG. 10. Again, it is assumed that the memory from which the response emanates is located at port 9 of bus 1 while the requesting subsystem is located at port 15 of bus 0.

The logic flow diagrams of FIGS. 10 and 11 describe a system utilizing two time-shared buses having a requesting subsystem on one bus and a memory subsystem on another bus. It will be recalled that ports 8, 9, 10 and 11 have been designated on each bus as memory ports. It will therefore be apparent that a memory subsystem could be connected to one of the four ports on each of the buses and subsystems connected to either bus could access both memory subsystems. A further extension of the concept of the present invention would contemplate two memory subsystems connected to two ports on each of the two buses while utilizing two pairs of inter-bus communication adapters connected to the remaining memory ports of each of the two buses. The latter configuration would provide for memory subsystems addressable by any subsystem on either bus. That is, a subsystem on bus 0 would only "know" that memory is available at its ports 8, 9, 10 and 11 and would not "know" that the memory subsystems on its buses' ports 10 and 11 are actually located on bus 1. In any of the above configurations, message flow is identical to that described in connection with the embodiment of FIG. 9; a request memory would be addressed to a memory port and if an inter-bus communications adapter is connected to that port, the message would be transmitted to the other bus and ultimately to a memory subsystem connected to the port of the same number on the second bus. All responses from the memory subsystems would be delivered to a pair of inter-bus communications adapters connected to those ports reserved for such adapters (ports 0, 1, 2 and 3) which would provide a communications path for messages in response to requests.

What is claimed is:

1. In a data processing system having a plurality of subsystems, a memory-sharing system comprising:
   a. a plurality of time-shared buses for carrying messages among subsystems connected thereto, each of said buses having a plurality of addressable ports to which subsystems may be connected;
   b. a memory subsystem connected to one of said buses at one of said ports for receiving and storing data and for supplying data in response to requests therefor;
   c. a requesting subsystem, connected to another of said buses at one of said ports, having means to generate a request message for memory, said request message including a message destination address and a message source address;
   d. a first inter-bus communication means connected to said one bus and to said other of said buses at a port on each bus, said inter-bus communication means responsive to the receipt of a message from said requesting subsystem for changing the destination address of said request message to direct said request message to the port on said one bus to which said memory is connected;
   e. said memory responsive to a request message received from said first inter-bus communication means requesting data for supplying said data and forming a response message, including a destination address the same as the source address of the request message received from said first inter-bus communication means;
   f. a second inter-bus communication means connected to said one bus and said other of said buses at a port on each bus, said second inter-bus communication means responsive to the response message of said memory for transmitting said response message from said one bus to the other of said buses; and
   g. said first and second inter-bus communication means each including a first adapter having an input buffer for receiving messages from said one bus and an output buffer for placing messages on said one bus, and a second adapter having an input buffer for receiving messages from said other bus and an output buffer for placing messages on said other bus, and a cable means connecting said first and second adapters with the output buffer of one connected to receive messages from the input buffer of the other, all messages and data transmitted from one bus to the other bus being transmitted through the input and output buffers of said first or second inter-bus communication means.

2. In a data processing system having a plurality of time-shared internal communication buses, each of said buses including a plurality of addressable ports for connection to subsystems, the improvement comprising:
   a. a memory subsystem connected to a port of one of said buses for receiving and storing data and for supplying data in response to requests therefor;
   b. a requesting subsystem, connected to another of said buses at one of the ports thereof, having means to generate a request message for memory, said request message including a message destination address and a message source address;
   c. a first inter-bus communication means connected to said one bus and said other of said buses at a port on each bus, said inter-bus communication means responsive to the receipt of the message from said requesting system for changing the destination address of said request message to direct said request message to the port on said one bus to which said memory is connected;
   d. said memory responsive to a request message received from said first inter-bus communication means requesting data for supplying said data and forming a response message, including a destination address the same as the source address of the request message received from said first inter-bus communication means;

e. a second inter-bus communication means connected to said one bus and the said other of said buses at a port on each bus, said second inter-bus communication means responsive to the response message of said memory for transmitting said response message from said one bus to said other bus; and f. said first and second inter-bus communication means each including a first adapter having an input buffer for receiving messages from said one bus and an output buffer for placing messages on said one bus, and a second adapter having an input buffer for receiving messages from said other bus and an output buffer for placing messages on said other bus, and a cable means connecting said first and second adapters with the output buffer of one connected to receive messages from the input buffer of the other, all messages and data transmitted from one bus to the other bus being transmitted through the input and output buffers of said first or second inter-bus communication means.

3. In a data processing system having a plurality of subsystems, a memory-sharing system comprising:

a. a first time-sharing bus for carrying messages along subsystems connected thereto;

b. a second time-sharing bus for carrying messages along subsystems connected thereto;

c. each of said buses having a plurality of addressable ports to which subsystems may be connected;

d. a memory connected to said first bus at one of said ports for receiving and storing data and for supplying data in response to requests therefor;

d. a requesting subsystem, connected to said second bus at one of said ports, having means to generate a request message for memory, said request message including a message destination address and a message source address;

f. a first inter-bus communication means connected to both of said buses at a port on each bus, said inter-bus communication means responsive to the receipt of a message from said requesting subsystem for changing the destination address of said request message to direct said request message to the port on said first bus to which said memory is connected;

g. said memory responsive to a request message received from said first inter-bus communications means requesting data for supplying said data and forming a response message including a destination address the same as the source address of the request message received from said first inter-bus communication means;

h. a second inter-bus communication means connected to both of said buses at a port on each bus;

i. said second inter-bus communication means responsive to the response message of said memory for transmitting said response message from said first bus to said second bus; and j. said first and second inter-bus communication means each including a first adapter having an input buffer for receiving messages from said one bus and an output buffer for placing messages on said one bus, and a second adapter having an input buffer for receiving messages from said other bus and an output buffer for placing messages on said other bus, and a cable means connecting said first and second adapters with the output buffer of one connected to receive messages from the input buffer of the other, all messages and data transmitted from one bus to the other bus being transmitted through the input and output buffers of said first or second inter-bus communication means.

4. In a data processing system having a plurality of subsystems, a memory-sharing system comprising:

a. first and second time-sharing buses for carrying messages among subsystems connected thereto, each of said buses having a plurality of addressable ports to which subsystems may be connected, at least two of said ports on each bus being designated memory ports;

b. a memory subsystem connected to a memory port on said first bus for receiving and storing data and for supplying data in response to requests therefor;

c. a non-memory subsystem connected to said second bus at one of said ports, having means to generate a request message for memory, said request message including a message destination address and a message source address, said message destination address including the address of one of said memory ports on said second bus;

d. a first inter-bus communication means connected to another of said memory ports on said first bus and connected to said one of said memory ports on said second bus, said first inter-bus communication means responsive to the receipt of a message from said non-memory subsystem addressed to said one of said memory ports on said second bus for changing the destination address of said request message to direct said request message to the memory port on said first bus to which said memory subsystem is connected;

e. said memory responsive to a request message received from said first inter-bus communication means requesting data for supplying said data and forming a response message, including a destination address the same as the source address of the request message received from said first inter-bus communication means; and f. a second inter-bus communication means connected to both of said buses at a port on each bus, said second inter-bus communication means responsive to the response message of said memory for transmitting said response message from said first bus to said second bus; and g. said first and second inter-bus communication means each including a first adapter having an input buffer for receiving messages from said one bus and an output buffer for placing messages on said one bus, and a second adapter having an input buffer for receiving messages from said other bus and an output buffer for placing messages on said other bus, and a cable means connecting said first and second adapters with the output buffer of one connected to receive messages from the input buffer of the other, all messages and data transmitted from one bus to the other bus being transmitted through the input and output buffers of said first or second inter-bus communication means.

* * * * *

UNITED STATES PATENT OFFICE
CERTIFICATE OF CORRECTION

Patent No. 4,041,472　　　　　　　　　Dated August 9, 1977

Inventor(s) Niranjan S. Shah et al.

It is certified that error appears in the above-identified patent and that said Letters Patent are hereby corrected as shown below:

Column 15, line 27, delete "along" and substitute -- among --.

Column 15, line 30, delete "along" and substitute -- among --.

Column 15, line 36, delete "d." and substitute -- e. --.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*